(12) United States Patent
Cicchiello et al.

(10) Patent No.: US 7,146,060 B2
(45) Date of Patent: Dec. 5, 2006

(54) REAL-TIME CORRECTION OF PHASE DISTORTION

(76) Inventors: James M. Cicchiello, 328 Carl Sands Dr., Cary, IL (US) 60013; Hao C. Tran, 1022 Huntington Dr., Elk Grove Village, IL (US) 60007

( * ) Notice: Subject to any disclaimer, the term of this patent is extended or adjusted under 35 U.S.C. 154(b) by 802 days.

(21) Appl. No.: 10/329,688

(22) Filed: Dec. 27, 2002

(65) Prior Publication Data
US 2004/0124335 A1 Jul. 1, 2004

(51) Int. Cl.
*G06K 9/00* (2006.01)
(52) U.S. Cl. .................................. 382/275; 382/284
(58) Field of Classification Search ............... 382/275, 382/284, 274; 375/344; 356/520, 521; 348/614
See application file for complete search history.

(56) References Cited

U.S. PATENT DOCUMENTS

| | | | | |
|---|---|---|---|---|
| 3,923,400 A | * | 12/1975 | Hardy | 356/521 |
| 4,298,944 A | * | 11/1981 | Stoub et al. | 382/274 |
| 4,424,533 A | * | 1/1984 | Rzeszewski | 348/614 |
| 4,645,346 A | * | 2/1987 | Fontanella | 356/520 |
| 4,688,086 A | | 8/1987 | Hutchin | |
| 5,113,865 A | * | 5/1992 | Maeda et al. | 600/410 |
| 5,627,847 A | * | 5/1997 | Leger | 372/9 |
| 5,757,864 A | * | 5/1998 | Petranovich et al. | 375/344 |
| 6,111,840 A | * | 8/2000 | Hajjar | 369/112.02 |
| 6,344,640 B1 | | 2/2002 | Rhoads | |
| 6,570,394 B1 | * | 5/2003 | Williams | 324/620 |
| 6,989,823 B1 | * | 1/2006 | Lasneski | 345/204 |

* cited by examiner

*Primary Examiner*—Sanjiv Shah
(74) *Attorney, Agent, or Firm*—Birch, Stewart, Kolasch & Birch, LLP

(57) ABSTRACT

A phase distortion device/method has been developed to improve images. A wave source generates waves, which stimulate the reflection and/or emission of narrow-band waves from an object of interest or a nearby object. The phase distortion of the narrow-band waves is used to obtain an impulse response function, which is then used to correct an image formed by illumination waves.

15 Claims, 2 Drawing Sheets

ONE EMBODIMENT OF A REAL TIME PHASE DISTORTION CORRECTION IMAGING DEVICE

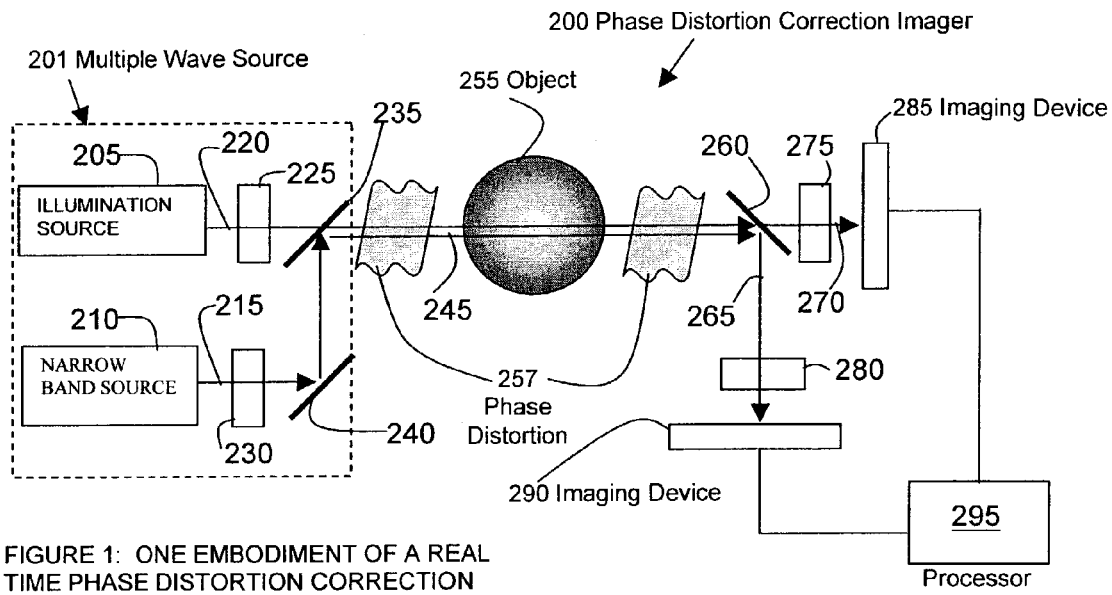
FIGURE 1: ONE EMBODIMENT OF A REAL TIME PHASE DISTORTION CORRECTION IMAGING DEVICE
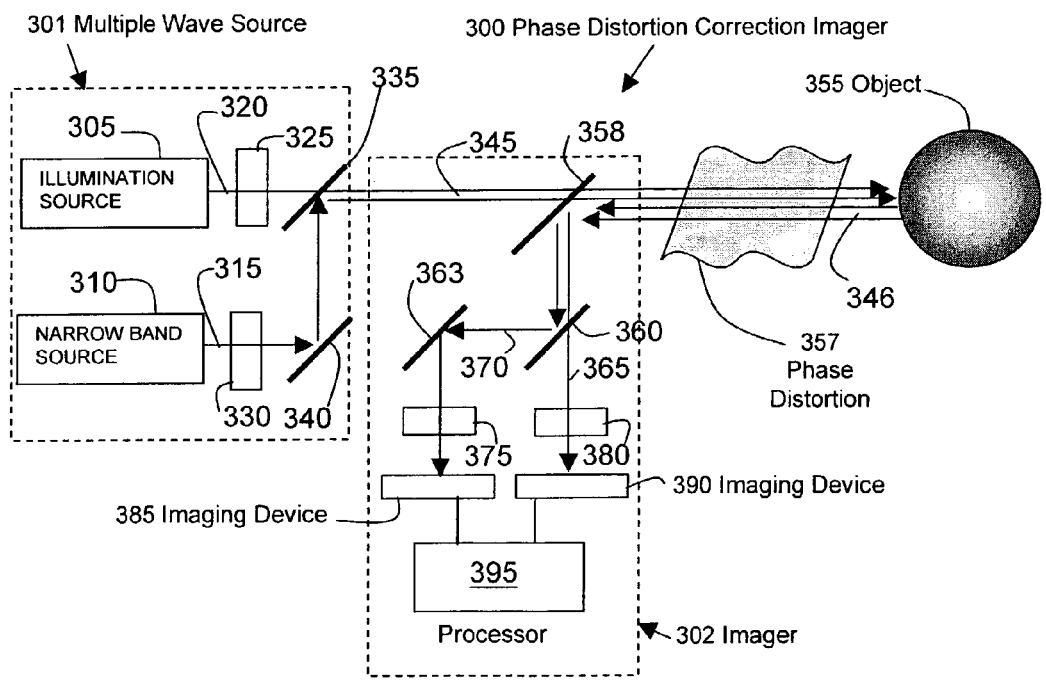
FIGURE 2: AN ADDITIONAL EMBODIMENT OF A REAL TIME PHASE DISTORTION CORRECTION IMAGING DEVICE

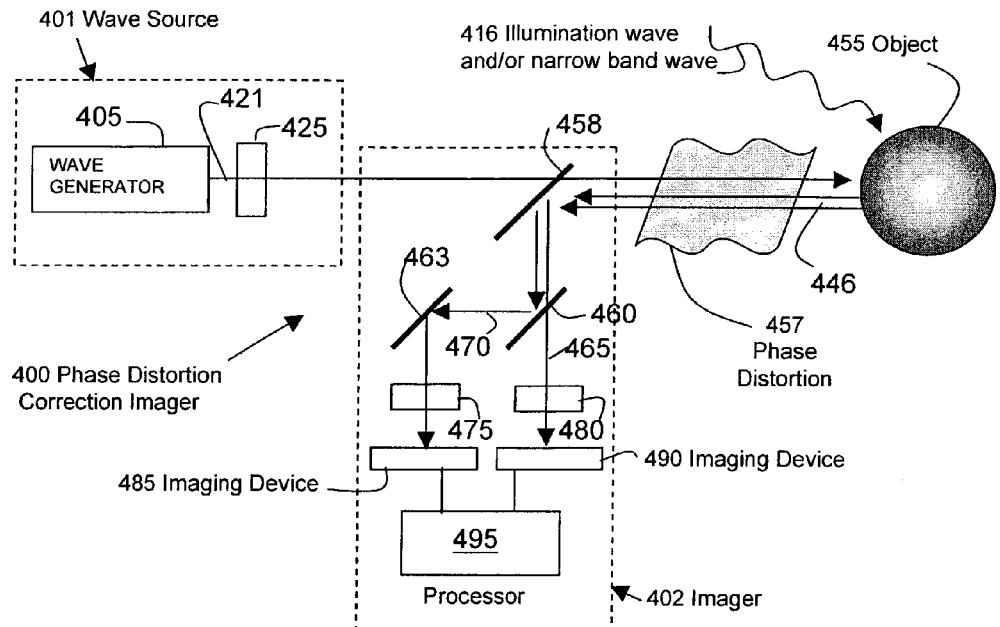
FIGURE 3: AN ADDITIONAL EMBODIMENT OF A REAL TIME PHASE DISTORTION CORRECTION IMAGING DEVICE
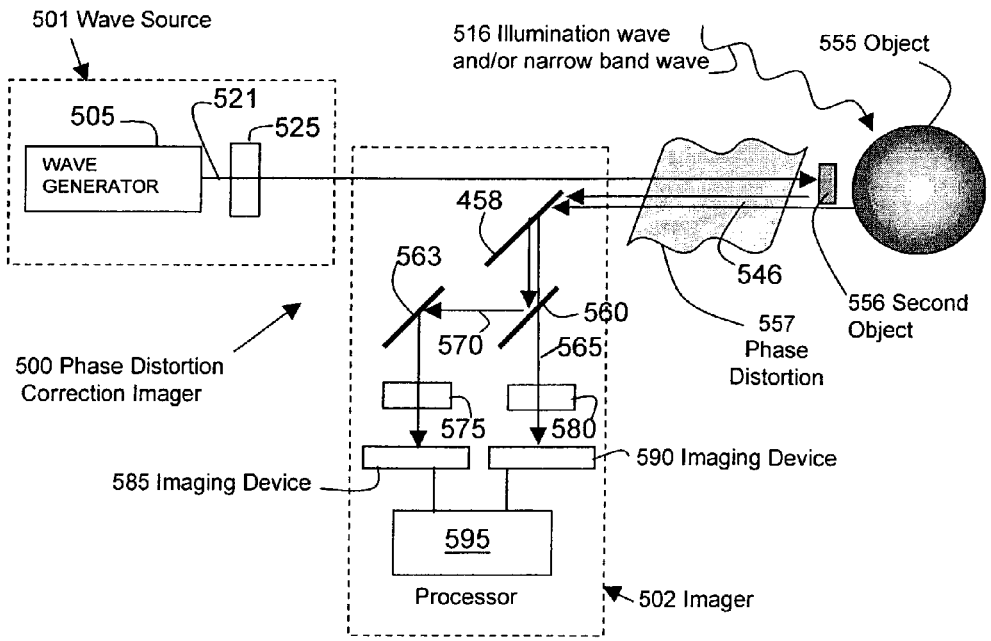
FIGURE 4: AN ADDITIONAL EMBODIMENT OF A REAL TIME PHASE DISTORTION CORRECTION IMAGING DEVICE

REAL-TIME CORRECTION OF PHASE DISTORTION

BACKGROUND OF THE INVENTION

1. Field of the Invention

The present invention relates to a method, apparatus, and system for correction of phase distortion of waves. More particularly it relates the correction of air turbulence effects of electromagnetic waves.

2. Background Information

Waves are affected by passing through mediums. For example electromagnetic plane waves exhibit a phase shift while passing through fluids (e.g., the atmosphere) of differing indices of refraction. A signal will change as it traverses through a medium and knowing the phase effect of the medium, which can vary spatially and temporally, one can filter the medium's effect to acquire the original signal. For example one could filter out phase distortion effects of the medium and obtain clearer images.

In the fields of astronomy, free-space communications, and directed-energy applications a beacon (natural or artificial) is used to characterize the intervening atmospheric disturbances. The beacon emission is used to measure (wavefront detection) the turbulence-induced phase error, $\phi(t,x,y)$, created by the atmosphere. Deformable mirrors then correct the astronomical image, often involving incoherent radiation. Such correction allows for the astronomical imaging of dim stellar objects, since the noisy phase distortions have been removed. These astronomical techniques often involve post-processing, in which numerous images are averaged to reduce noise.

In free-space communications and directed-energy applications, typically involving coherent radiation, wavefront sensors and deformable mirrors actively correct the disturbance in real time. Systems involving real-time detection of wavefronts and correction can be complex and the equipment and computation can be expensive.

To avoid the use of deformable mirrors and expensive equipment researchers have sought to utilize the information available to a wavefront detector to correct the image digitally, i.e. modeling of the medium's effect on the traveling wave.

The correction of turbulence effects on electromagnetic waves requires real-time wavefront reconstruction. Some imaging systems, susceptible to atmospheric turbulence, having temporal time scales on the order of tens of Hertzs (e.g. 10 Hz), suffer from decreases in image resolution due to phase errors. A figure of merit indicating how quickly the atmospheric disturbances convect and evolve is the Greenwood frequency $f_G$. The Greenwood frequency can be expressed as $f_G=(0.43)v_w/r_0$, where $v_w$ is the wind speed, and $r_0$ is the Fried coherence diameter. As mentioned above, atmospheric disturbances have frequencies on the order of tens of Hertzs. A correction system would have to sample and correct the phase distortions with a frequency greater than the Greenwood frequency of the disturbance.

In current imaging applications researchers have attempted to model the effect of atmospheric turbulence using a modulation transfer function, $MTF_{turb}=|H(f)|$, that is spatially dependent on the turbulence size of eddy's ($L_0$), the propagation constant "k", the refractive-index structure $C_n^2$, the spatial frequency $\xi$, the focal length "F", the propagation path "z", the wavelength $\lambda$, and the Fried diameter $r_0$. One such transfer function is given as:

$$MTF_{Turb} = |H(f)| = \begin{cases} e^{-(2.01\xi F\lambda/r_0)^{5/3}}, & z \gg (0.4k^2C_n^2L_0^{5/3})^{-1} \\ 1, & z \ll (0.4k^2C_n^2L_0^{5/3})^{-1} \end{cases} \quad (1)$$

Often the impulse response function (IRF), which is the Fourier inverse of H(f), is use. The disadvantage of current modeled transfer functions is that they treat irregularities in a statistical manner. This does not allow the dynamic nature of atmospheric turbulence (irregularities) to be treated in a real time fashion. Hence H(f) is a function of frequency "f" but should in reality be treated as a function of time "t" as well (H(f,t)).

Hence a system/device/method, which avoids the use of wavefront sensors and deformable mirrors but takes into account the temporal nature of atmospheric irregularities to correct images is desirable.

SUMMARY OF THE INVENTION

It is an object of the present invention to provide a device/method that reduces the effect of turbulence effects on imaging.

It is further an object of the present invention to provide a device/method that reduces the effect of atmospheric turbulence on electromagnetic imaging.

It is further an object of the present invention to provide a device/method that uses a beacon's IRF to reduce the effect of atmospheric turbulence on wave imaging.

It is further an object of the present invention to provide a device/method that uses an optically augmented (OA) glints' IRF to reduce the effect of atmospheric turbulence on imaging.

These and other objects of the present invention may be realized by providing a device/method using the IRF of narrow-band waves (e.g. from OA glint) to determine the effect of atmospheric turbulence, which is used in the real-time correction of images. A device can stimulate the emission of narrow-band waves from the object of interest or a neighboring object. The emitted narrow-band waves will be spread from the emission point to the imager, defined by the narrow-band wave's IRF. The IRF can be used to determine the atmospheric turbulence's (an example of a phase distortion) effect on the imaging and used to improve the image.

According to one implementation of the present invention, the narrow-band waves are caused by excitation of the target by an external narrow-band source forming a narrow-band signal, which is directed from the target to the imager along with the natural illumination of the target. The natural illumination of the target, forming a natural-illumination image, is separated from the narrow-band signal to acquire the IRF of the narrow-band signal at the image time $t_0$. The IRF is used to perform real-time correction of turbulence in the natural illumination image.

According to another implementation of the present invention, the narrow-band waves are caused by excitation of the target by an external narrow-band source forming a narrow-band signal, which is directed from or near the target to the imager along with the reflected light from an illumination source. The object reflected light from the illumination source, forming an illumination image, is separated from the narrow-band signal to acquire the IRF of the narrow-band signal at the image time $t_0$ and imager position. The IRF is used to perform real-time correction of turbulence in the illumination image.

According to another implementation of the present invention, the narrow-band waves are caused by an emission source from the target, forming a narrow-band signal, which is emitted to the imager along with reflected light from an illumination source, forming an illumination image. The reflected light is separated from the narrow-band signal to acquire the IRF of the narrow-band signal at the image time $t_0$ and imager position. The IRF is used to perform real-time correction of turbulence in the illumination image.

Further scope of applicability of the present invention will become apparent from the detailed description given herein. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only, and thus are not limitative of the present invention, and wherein:

FIG. 1 illustrates an embodiment in accordance with the subject invention for the correction of phase distortions to imaging of the waves passing through an object in real-time;

FIG. 2 illustrates an embodiment in accordance with the subject invention for the correction of phase distortions to reflection imaging of an object in real-time;

FIG. 3 illustrates a preferred embodiment of a device, according to the present invention, for the correction of phase distortions to imaging of an object in real-time, where the object is illuminated by an illumination wave and a narrow-band wave and where either wave is stimulated/generated by a wave generator; and FIG. 4 illustrates yet another embodiment in accordance with the subject invention of a device, according to the present invention, for the correction to phase distortions to imaging of an object in real-time, where the object is illuminated by an illumination wave and a second object is illuminated by a narrow-band wave and where either wave is stimulated/generated by a wave generator.

DETAILED DESCRIPTION

The present invention is a method/device containing at least two image devices, each of which detect different groups of signals that can be filtered out prior to the image devices by optical devices. One image device determines the IRF of a narrow-band signal (also referred to herein as narrow-band waves), and a second image device determines an image of the object of interest. The IRF determined is used (e.g. in a processor) to correct the image of the second image device.

When the IRF, $h(t_0,x,y)$, is determined at a time of observation $t_0$, and at spatial locations on the image in the x and y direction, it can be used to correct the phase distortion of the waves forming the image of the object of interest. First the transfer function or the Fourier transform of $h(t_0,x,y)$, $H(t_0, f_x, f_y)=FT\{h(t_0,x,y)\}$, is calculated. The image intensity $i(t_0, x, y)$ of the object is detected and can be related to the truthful intensity of the object $o(t_0, x, y)$ by the expression:

$$FT\{i(t_0,x,y)\}=FT\{h(t_0,x,y)\otimes o(t_0,x,y)\}=H(t_0,f_x,f_y)O(t_0,f_x,f_y)$$

Further $FT\{i(t_0,x,y)\}=I(t_0,f_x,f_y)$ and thus an estimate of the true object intensity $\hat{O}\sigma(t_0,f_x,f_y)$ can be expressed as:

$$\hat{o}(t_0, f_x, f_y) = \frac{I(t_0, f_x, f_y)}{H(t_0, f_x, f_y)} = IF(t_0, f_x, f_y)I(t_0, f_x, f_y) \quad (3)$$

where $IF(t_0,f_x,f_y)$ is called the inverse filter, and the expression is considered an estimate since the IRF of a different set of waves (other than the illumination waves) is used for correction (e.g. the narrow-band waves). Therefore in accordance with the present invention the image intensity $i(t_0,f_x,f_y)$, of the object of interest, is measured by an image device at time $t_0$ and its associated Fourier transform, $I(t_0,f_x,f_y)$ is calculated/measured. The IRF, of narrow-band waves, is measured by an imaging device and used to obtain the transfer function $H(t_0,f_x,f_y)$ whose inverse is the inverse filter $IF(t_0,f_x,f_y)$. The inverse filter and the Fourier transform of the image intensity are used to obtain an estimate of the true image $\hat{O}(t_0,f_x,f_y)$. Other variations of the formulas described above are possible within the scope of the present invention and one of ordinary skill would be able to vary the order of solution and the measuring steps needed to acquire an estimated true image, and such variations are intended to be within the scope of the present invention provided such steps determine an IRF. For example, the same device that measures the image intensity can measure the IRF.

In accordance with various exemplary embodiments of the present invention, an illumination source is used to illuminate an object of interest. In other embodiments discussed below an illumination and narrow-band source may be naturally-occurring sunlight, or other natural electromagnetic waves. In addition to an illumination source a narrow-band source generates narrow-band waves with known initial characteristics or stimulates the emission of narrow-band waves from the object or a nearby object. Both sets of waves travel through (or are reflected off, in later described embodiments) the object of interest and are separated later by optical devices. The separated waves are incident on different sets of image devices. One of the image devices uses the changed characteristics of the narrow-band waves to determine the phase distortion encountered (in the form of an IRF) while traveling through the object and the medium. The determined IRF is used to correct the images detected by another imaging device. Corrected images allow better target (object) identification.

FIG. 1 illustrates one embodiment of a phase-distortion-correction imager 200 developed in accordance with the present invention, where the phase distortion of an image is corrected. The correction imager 200 has a polychromatic source 201, which generates the illumination waves 220 and narrow-band waves 215. The illumination waves are generated by an illumination source 205 (e.g. visible light, infrared light, and like sources) and the narrow-band waves are generated by a narrow-band source 210 (e.g. any laser and other like sources). The waves 215, 220 can be colliminated, dispersed, focused, polarized, phase distorted, refracted, or otherwise optically manipulated via optical devices 225, 230, 275, and 280. The waves 215 and 220 are combined by optical devices 240, 235, or can be emitted individually and focused by the same device. The combined or separately-emitted waves 245 travel through a medium, containing the object of interest 255. Phase distortions 257 are created by the medium in the waves 245 (e.g. variable indices of refraction due to air turbulence). The combined waves 245 traveling through the object and medium (in later described embodiments the combined waves are reflected from the object of interest) are collected and separated by optical device 260 into at least two sets of waves 270 and 265, one of which contains the narrow-band wave(s) 215.

For discussion purposes we will assume that the set of waves 265 contains, as a component, the narrow-band wave(s) 215, although either set of waves 265 and/or 270 can contain a component comprising the narrow-band waves(s) 215. The set of waves 265 can be manipulated by an optical device 280 (for example to separate out the narrow-band waves 215). The optically-manipulated sets of waves 265 are imaged/detected by a imaging device 290 (e.g. focal plane array (FPA) or other like wave detectors) and the IRF of the narrow-band waves 215 is determined either by the imaging device 290 or an attached processor 295. The other set of waves 270 can likewise be optically manipulated by optical device 275 before illuminating a second imaging device 285. The imaging device 285 obtains data by imaging and/or detecting the waves from the set of waves 270. The image or data obtained is corrupted with phase distortion from the medium and the object of interest 255. The IRF determined for the narrow-band waves 215 is used to correct, as described above, the data and/or image detected by the imaging device 285.

The illumination source 205 and narrow-band source 210 can be any type of electromagnetic wave (e.g. infrared laser) source, and the discussion herein should not be interpreted to limit the type of illumination and narrow-band source. The illumination waves 220 can also be emitted by the object of interest (e.g. infrared emission). Likewise, the object 255 of interest can generate the narrow-band waves 215 and thus the narrow-band source 210 would not be contained in the multiple wave source 201. Additionally, the narrow-band waves may be emitted from the object or an object near the object of interest by external stimulation by a laser.

A laser impinging upon the object of interest can stimulate for example Optically Augmented Glint (OA Glint), serving as the narrow-band source. The emitted narrow-band waves serve as a point source in this incidence. If both the illumination waves 220 and the narrow-band waves 215 are generated by the environment and/or the object 255 of interest or a nearby object (e.g. object 556 in FIG. 4) then the multiple wave source 201 is not needed in such an embodiment of the present invention (likewise not needed in the embodiments of the present invention shown in FIGS. 2, 3, and 4). Hence, the discussion herein should not be interpreted to limit the multiple wave source 201 to containing both an illumination source and a narrow-band source, it may contain neither in other embodiments within the scope of the present invention.

The optical devices 225, 230, 235, 240, 260, 275, 280, can be birefringent crystals, polarizers, prisms, lenses, mirrors, beam splitters, optical filters, diffraction gratings, lenslet arrays, optical amplifiers, micro-mirrors, micro-lens arrays, waveguides, or other such devices that can redirect and/or amplify, and/or filter and/or separate and/or combine waves in a designed fashion for the particular objective. The discussion herein should not be interpreted to limit the type of optical device used to accomplish the wave paths in the embodiments of the present invention (e.g. those shown in FIGS. 1–4).

The object 255 can be any object of interest. In the embodiment shown in FIG. 1 the combined waves 245 pass through the object 255. These waves include phase distortion, from the environment (medium) and the object, and can be composed of transmitted, refracted, diffracted, and generated waves (e.g. by the object 255 and/or environment).

The imaging devices 285 and 290 can be any imaging device/detector, one of which at least provides data that can be used to determine the IRF of the narrow-band waves and data, which can be viewed in image form, hence the imaging devices 285 and 290 can image and/or detect and/or measure waves incident on the imaging devices. For example in optical situations the image devices can be focal plane arrays. Additionally the imaging devices 285 and 290 may be different types of devices, for example imaging device 290 may detect the signal of the narrow-band wave via an antenna device and use the signal to obtain the IRF, while the other image device 285 may be a FPA and show a pixilated array with a corresponding image. The signals from the imaging devices 285 and 290 can be fed to a processor 295 that takes the signals and generates a IRF for the narrow-band waves knowing the narrow-band wave's initial condition, if the imaging devices does not generate an IRF independently. The processor 295 can be any type of microprocessor that can change the data signals from the imaging devices 285, 290 into useable digital signals that can be manipulated to derive the IRF.

Alternatively, the imaging devices 285 and/or 290 can derive the IRF independently from the measured characteristics of the narrow-band waves 215. In either case the discussion herein should not be interpreted to limit the type of processor used. The term processor used herein includes the memory needed for storage, the I/O, and the processing portion.

In another embodiment of the present invention the illumination waves and the narrow-band waves are reflected from the object of interest. FIG. 2 illustrates an exemplary phase-distortion-correction imager 300 developed in accordance with the present invention, where the phase distortion of an image is corrected. The correction imager 300 has a multiple wave source 301, which generates the illumination waves 320 and narrow-band waves 315. The illumination waves are generated by an illumination source 305 (e.g. visible light, infrared light, and like sources) and the narrow-band waves are generated by a narrow-band source 310 (e.g. any laser and other like sources). The waves 315, 320 can be colliminated, dispersed, focused, polarized, phase distorted, refracted, or otherwise optically manipulated via optical devices 325, 330, 375, and 380.

The waves 315 and 320 are combined by optical devices 340, 335, or can be emitted individually and focused by the same optical device. The combined or separately-emitted waves 345 travel through a medium, containing the object of interest 355. Phase distortions 357 are created by the medium in the waves 345 (e.g. by variable index of refractions caused by air turbulence and other like mechanisms that cause phase distortion). The combined waves can pass through an optical device 358, which is used to direct the combined waves 346, returning from the object 355, into the imager 302. The imager 302 separates the combined waves such that the IRF of the narrow-band waves can be determined. In the imager 302, the combined waves 346 are collected and separated by optical devices 358 and 360 into at least two sets of waves 370 and 365, one of which contains the narrow-band wave(s) 315.

For discussion purposes we will assume that the set of waves 365 contains as a component the narrow-band wave(s) 315, although either set of waves 365 and/or 370 can contain a component comprised of the narrow-band waves(s) 315. The set of waves 365 can be manipulated by an optical device 380 (for example to separate out the narrow-band waves 315). The optically-manipulated sets of waves 365 are imaged/detected by a imaging device 390 (e.g. focal plane array FPA or other like wave detectors) and the IRF of the narrow-band waves 315 is determined either by the imaging device 390 or an attached processor 395. The other set of waves 370, are reflected by optical device 363 into optical device 375. Waves 370 can be optically manipulated by optical device 375 before illuminating a second imaging device 385. The imaging device 385 obtains data by imaging and/or detecting the waves from the set of waves 370. The image or data obtained is corrupted with phase distortion from the medium and the object of interest 355. The IRF determined for the narrow wave band 315 is used, as described above, to correct the data and/or image detected by the imaging device 385.

The optical devices 325, 330, 335, 340, 358, 360, 363, 375, 380 can be the same type of optical devices described with reference to FIG. 1. Likewise the illumination source 305 and the narrow-band source 310 can also be the same type of sources as those described with reference to FIG. 1. Additionally, as is the case for all of the embodiments shown in FIGS. 1–4, the optical devices are optional and optionally arranged. A different number of orientations can be used and any number of optical devices may be absent from additional embodiments. For example another embodiment within the scope of the present invention would be the imager 300 shown in FIG. 2 without the optical devices 325, 330, 367, and 380. Other similar variations are envisioned and considered within the scope of the present invention for all of the embodiments shown in FIGS. 1–4.

The processor 395 (FIG. 2) fulfills the same function as the processor 295 described with respect to FIG. 1 and can contain the same characteristics and operation.

In preferred embodiment of the invention, which is similar to that described in FIG. 2, the illumination and/or narrow-band waves are generated outside the wave source. FIG. 3 illustrates an exemplary phase-distortion-correction imager 400 developed in accordance with the present invention, where the phase distortion of an image is corrected. The correction imager 400 can have a wave source 401, which generates waves 421 that are either the illumination waves or the narrow-band waves. The waves generated by the wave source 401 are dependent upon the waves 416 generated outside the wave source 401.

For purposes of the present invention the "environment" is defined as any region or device outside the inventive device (e.g. separate device(s) acting as wave sources, the target acting as a wave source, other like situations). For example if the environment acts as the illumination wave source then the wave source 401 would generate the narrow-band waves from the wave generator 405. If the environment generates the narrow-band waves (e.g. from an alternative source) then the wave generator would generate the illumination waves. Likewise if the environment generates both the illumination and narrow-band waves (e.g. from an alternative source) then the wave source 401 would not be needed and an embodiment according to the present invention would not contain the wave source 401. For discussion purposes only we assume that the environment generates the illumination waves that are reflected from the object of interest 455, hence for this example the environmentally generated waves 416 are illumination waves, making wave source waves 421 narrow-band waves. The illumination waves 416 may be visible light, infrared light, and the like. In this case the wave generator 405 generates the narrow-band waves 421 (e.g. any laser and other like sources). The waves 421, and combined waves 446, from the object 455, can be collimated, dispersed, focused, polarized, phase distorted, refracted, or otherwise optically manipulated via optical devices 425, 458, 460, 463, 475, and 480. The wave source waves 421 and combined waves 446 travel through a medium, containing the object of interest 455. Phase distortions 457 are created by the medium in the waves 446 (e.g. by variable index of refraction caused by air turbulence and other like mechanisms that cause wave phase distortion). The combined waves can initially pass through an optical device 458 in one direction, which is used to direct the combined waves 446 from a different direction into the imager 402.

Additionally the combined waves or the wave-generator waves 421 may not initially pass through the optical device 458 in one direction, and the optical device 458 may only be used to direct the combined waves 456. Note that the reflected waves 446 can be in actuality emitted waves from the object of interest 455 stimulated by the waves 421 from the wave source 401 and/or the environment waves 416 (e.g. OA Glint). The imager 402 separates the combined waves such that the IRF of the narrow-band waves can be determined. In the imager 402, the reflected combined waves 446 are collected and separated by optical devices 458 and 460 into at least two sets of waves 470 and 465, one of which contains the narrow-band wave(s), in this example waves 421.

For discussion purposes we will assume that the set of waves 465 contains as a component the narrow-band wave(s) 421, although either set of waves 465 and/or 470 can contain a component comprised of the narrow-band waves(s) 421. The set of waves 465 can be manipulated by optical device 480 (for example to separate out the narrow-band waves 421). The optically-manipulated sets of waves 465 are imaged/detected by a imaging device 490 (e.g. (FPA) or other like wave detectors) and the IRF of the narrow-band waves 421 is determined either by the imaging device 490 or an attached processor 495. The other set of waves 470, are reflected by optical device 463 into optical device 475. Waves 470 can be optically manipulated by optical device 475 before illuminating a second imaging device 485. The imaging device 485 obtains data by imaging and/or detecting the waves from the set of waves 470. The image or data obtained is corrupted with phase distortion from the medium and the object of interest 455. The IRF determined for the narrow wave band 421 is used, as described above, to correct the data and/or image detected by the imaging device 485.

The optical devices 425, 458, 463, 460, 475, and 480 can be the same type of optical devices described with reference to FIG. 1. Likewise the wave generator 405 can be the same as the illumination sources and the narrow-band sources described with reference to FIG. 1.

The processor 495 (FIG. 3) fulfills the same function as the processor 295 described with respect to FIG. 1 and can contain the same characteristics and operation.

In yet another embodiment of the present invention, which is similar to that described in FIG. 3, the illumination and/or narrow-band waves are generated outside the wave source, and the waves generated in a wave source 501 are reflected off of a second object 556. Note that the reflected waves can be in actuality emitted waves from the object of interest 555 and/or the second object 556 stimulated by the waves 521 from the wave source 501. FIG. 4 illustrates an exemplary phase-distortion-correction imager 500 developed in accordance with the present invention, where the phase distortion of an image is corrected. The correction imager 500 can have a wave source 501, which generates waves 521 that are either the illumination waves or the narrow-band waves. The waves generated by the wave source 501 are dependent upon the waves 516 generated outside the wave source 501. For example if the environment acts as the illumination wave source then the wave source 501 would generate the narrow-band waves from the wave generator 505. If the environment generates the narrow-band waves then the wave generator would generate the illumination waves. Likewise if the environment generates both the illumination and narrow-band waves (e.g. alternative sources not operatively connected to the imager 502) then the wave source 501 would not be needed and an embodiment according to the present invention would not contain the wave source 501.

For discussion purposes only we assume that the environment generates the illumination waves that are reflected from the object of interest 555, hence for this example the environmentally-generated waves 516 are illumination waves, and the wave-source waves 521, are narrow-band waves. The illumination waves 516 may be visible light, infrared light, and the like. In this case the wave generator 505 generates the narrow-band waves 521 (e.g. any laser and other like sources). The waves 521, and combined waves 546 can be colliminated, dispersed, focused, polarized, phase distorted, refracted, or otherwise optically manipulated via optical devices 525, 558, 560, 563, 575, and 580. The wave-source waves 521 and combined waves 546 travel through a medium, containing the object of interest 555 and a second object 556. Phase distortions 557 are created by the medium in the waves 556 (e.g. by variable indices of refraction caused by air turbulence and other like mechanisms that cause wave phase distortion). The combined waves can initially pass through an optical device 558 in one direction, which is used to direct the combined waves 546 from a different direction into the imager 502. Additionally the combined waves or the wave-generator waves 521 may not initially pass through the optical device 558 in one direction, and the optical device may only be used to direct the combined waves 556 from the object and nearby objects. Note that the reflected waves 546 can be in actuality emitted waves from the object of interest 555 and/or the second object 556 stimulated by the waves 521 from the wave source 501 and/or the environment waves 516 (e.g. OA Glint). The imager 502 separates the combined waves such that the IRF of the narrow-band waves can be determined. In the imager 502, the reflected combined waves 546 are collected and separated by optical devices 558 and 560 into at least two sets of waves 570 and 565, one of which contains the narrow-band wave(s), in this example waves 521.

For discussion purposes we will assume that the set of waves 565 contains as a component the narrow-band wave(s) 521, although either set of waves 565 and/or 570 can contain a component comprised of the narrow-band waves(s) 521. The set of waves 565 can be manipulated by optical device 580 (for example to separate out the narrow-band waves 521). The optically-manipulated sets of waves 565 are imaged/detected by a imaging device 590 (e.g. focal plane array FPA or other like wave detectors) and the IRF of the narrow-band waves 521 is determined either by the imaging device 590 or an attached processor 595. The other set of waves 570, are reflected by optical device 563 into optical device 575. Waves 570 can be optically manipulated by optical device 575 before illuminating a second imaging device 585. The imaging device 585 obtains data by imaging and/or detecting the waves from the set of waves 570. The image or data obtained is corrupted with phase distortion from the medium and the object of interest 555. The IRF determined for the narrow wave band 521 is used, as described above, to correct the data and/or image detected by the imaging device 585.

The optical devices 525, 558, 560, 563, 575, and 580 can be the same type of optical devices described with reference to FIG. 1. Likewise the wave generator 505 can be the same as the illumination sources and the narrow-band sources described with reference to FIG. 1.

Many variations in the design of incorporating using narrow-band waves to determine the phase distortions to correct images may be realized in accordance with the present invention. It will be obvious to one of ordinary skill in the arts to vary the invention thus described. Such variations are not to be regarded as departures from the spirit and scope of the invention, and all such modifications as would be obvious to one skilled in the art are intended to be included within the scope of the following claims.

We claim:

1. A phase-distortion-correction imaging device comprising:
   an optical device, which intercepts combined waves formed of illumination waves and narrow-band waves, the combined waves passing through and/or reflected from and/or emitted from an object of interest or a second object near the object of interest, where the narrow-band waves are generated in a manner such that the initial emission characteristics of the narrow-band waves are known;
   a first imager, that measures the illumination waves directed and separated from the combined waves by said optical device, resulting in data that can be used to form an image; and
   a second imager, that measures the narrow-band waves directed and separated from the combined waves by said optical device, where said second imager determines an impulse response function of the narrow-band waves
   a processor, wherein said processor is operatively connected to said first and second imagers, determines the impulse response function of the narrow-band waves at the time of measurement of said second imager, said processor using the impulse response function to improve data received from said first imager which can be used to form an improved image.

2. The device according to claim 1 further comprising:
   a wave source, wherein said wave source generates narrow-band waves that stimulate the emission of narrow-band waves from the object of interest or a second object near the object of interest, where the initial state of the narrow-band waves emitted from one of the objects is known.

3. The device according to claim 2 further comprising:
   a processor, wherein said processor is operatively connected to said first and second imagers, determines the impulse response function of the narrow-band waves at the time of measurement of said second imager, said processor using the impulse response function to improve the data received from said first imager which can be used to form an improved image.

4. The device according to claim 1 further comprising:
   a wave source, wherein said wave source generates illumination waves and generates narrow-band waves that stimulate the emission of narrow-band waves from the object of interest or a second object near the object of interest, where the initial state of the narrow-band waves emitted from one of the objects is known.

5. The device according to claim 4 further comprising:
a processor, wherein said processor is operatively connected to said first and second imagers, determines the impulse response function of the narrow-band waves at the time of measurement of said second imager, said processor using the impulse response function to improve the data received from said first imager which can be used to form an improved image.

6. The device according to claim 1, wherein the narrow-band waves are from OA Glint.

7. The device according to claim 1, wherein said first imager and/or said second imager are focal plane arrays.

8. A method of correcting phase distortion in an imaging device comprising:
intercepting, with an optical device, combined waves formed of illumination waves and narrow-band waves, the combined waves passing through and/or reflected from and/or emitted from an object of interest or a second object near the object of interest, where the narrow-band waves are generated in a manner such that the initial emission characteristics of the narrow-band waves are known;
measuring, with a first imager, the illumination waves directed and separated from the combined waves by said optical device, resulting in data that can be used to form an image;
measuring, with a second imager, the narrow-band waves directed and separated from the combined waves by said optical device, forming narrow-band wave data;
determining an impulse response function from the narrow-band wave data; and
improving the data received from said first imager by use of the impulse response function and forming an improved image therefrom.

9. The method according to claim 8 further comprising:
connecting a processor, to said first and second imagers;
calculating an impulse response function with said processor from the narrow-band wave data; and
improving data received from said first imager with said processor and forming an improved image therefrom.

10. The method according to claim 8 further comprising:
generating narrow-band waves to stimulate the emission of narrow-band waves from the object of interest or the second object near the object of interest, where the initial state of the narrow-band waves is known.

11. The method according to claim 10 further comprising:
connecting a processor, to said first and second imagers;
calculating an impulse response function with said processor from the narrow-band wave data; and
improving data received from said first imager with said processor and forming an improved image therefrom.

12. The method according to claim 8 further comprising:
generating illumination waves and narrow-band waves to stimulate the emission of narrow-band waves from the object of interest or a second object near the object of interest, where the initial state of the narrow-band waves is known.

13. The method according to claim 12 further comprising:
connecting a processor, to said first and second imagers;
calculating an impulse response function with said processor from the narrow-band wave data; and
improving data received from said first imager with said processor and forming an improved image therefrom.

14. The method according to claim 8, wherein the narrow-band waves are from OA Glint.

15. The method according to claim 8 wherein said first imager and/or said second imager are focal plane arrays.

* * * * *